Fig.2.

Inventor.
Joseph E. Clapp
by Heard Smith & Tennant.
Attys.

April 5, 1927.  J. E. CLAPP  1,623,829

ELECTRICAL APPARATUS COMPRISING A SLOW WAVE GENERATOR

Filed March 20, 1924   5 Sheets-Sheet 4

Inventor
Joseph E. Clapp
by Heard Smith & Tennant
Attys.

April 5, 1927.  J. E. CLAPP  1,623,829
ELECTRICAL APPARATUS COMPRISING A SLOW WAVE GENERATOR
Filed March 20, 1924   5 Sheets-Sheet 5

Inventor.
Joseph E. Clapp
by Heard Smith & Tennant
Attys.

UNITED STATES PATENT OFFICE.

JOSEPH E. CLAPP, OF AUBURNDALE, MASSACHUSETTS.

ELECTRICAL APPARATUS COMPRISING A SLOW-WAVE GENERATOR.

Application filed March 20, 1924. Serial No. 700,524.

This invention relates to improvements in electrical apparatus of the type in which mechanism is provided to modify a basic electric current, such as, a direct current or an alternating current to create in the circuit slow waves or surges having different forms and characteristics and the general object of the invention is to provide a novel machine or mechanism capable of creating in the primary or basic current slow waves of different forms and having different characteristics and also capable of producing novel modifications of the basic current.

The primary or basic currents employed may be usual galvanic or faradic battery currents, or commercial direct or alternating power currents of suitable voltage and amperage, or currents from other selected sources, or may be and preferably are currents supplied by a special generator forming part of the machine or apparatus.

The mechanism herein described is designed primarily for the production of currents to be used for medical purposes, but it will be understood that the machine and the modified currents produced thereby may be employed for scientific or industrial purposes within the spirit and scope of the invention as defined by the claims.

Any suitable basic current may be employed, such as, (1) a direct current, which is generally referred to in medical practice as a galvanic current. (2) An alternating current which in medical practice is known as a rapid sinusoidal current; or (3) a rapid pulsatory direct current. The galvanic current or the pulsatory current may also be reversed in direction at predetermined intervals and each of the currents may be so modified, by the mechanism herein described, as to produce various different forms of waves having different characteristics.

An object of the present invention is to provide means by which the desired polar action of the current may be obtained either from the direct or pulsatory current in their unmodified or modified forms.

I am aware that various instruments have been designed for producing slow electrical waves for medical purposes, but so far as I am aware none of such instruments are adapted to produce all the variations and characteristics above mentioned which are necessary to produce maximum therapeutic effects and none of such instruments are capable of supplying waves which can be used intermittently when desired and none supplies means for modifying any selected basic current to form waves adapted to cause characteristic normal contraction of all of the various muscles.

The object of the present invention is to produce a mechanism or apparatus capable of producing electrical waves corresponding to the various normal actions of the muscles above described and others, and by means of which apparatus the basic current may be modified to produce, first, a variation in the frequency or duration of the waves; second, variation in the form of the wave as may be desired; third, means for selectively supplying either continuous or intermittent waves; fourth, selectively causing the waves produced to be either continuous or intermittent; fifth, causing the waves to be either unidirectional or of alternating polarity; and, sixth, modifying any basic current, such as, a direct, a sinusoidal or a pulsatory direct current in such a manner as to produce slow waves either continuously or intermittently or of such frequency, wave form and strength as may be desired.

A further feature of the invention consists in providing means for controlling the voltage and amperage of the basic current used for producing these waves as to produce the most beneficial results in the particular case of treatment. This preferably is accomplished by controlling the voltage and amperage of the modified current which is employed by means of a shunt resistance, although other means such as a series resistance or variable induction may be used for the purpose.

Other objects and features of the invention will more fully appear from the following description and the accompanying drawings and will be particularly pointed out in the claims.

The invention is illustrated herein as embodied in a self-contained electrical apparatus selectively operable to generate a direct, an alternating or a pulsatory basic electric current and having means for modifying the selected current to produce waves having predetermined different forms and characteristics and also including current-reversing mechanism and pole-changing mechanism by means of which the direct and pulsatory basic currents may be utilized in such a manner as to obtain the particular beneficial results above defined.

The illustrative embodiment of the invention disclosed herein is designed for electrotherapeutic use and comprises an electric circuit having means adapted either to receive or to generate a suitable current, a shunt branch of said circuit having therein a rheostat which may be adjusted to deliver a current of selected voltage through the shunt, means in said shunt to create waves or surges in the current which passes through the shunt, a reversing device by means of which the polarity of certain types of current may be automatically changed at predetermined intervals, a selector mechanism by means of which the particular type of current supplied to the circuit may be chosen and simultaneously therewith such electrical connections made as will deliver the desired character of the current through the shunt circuit. The apparatus also discloses a fixed resistance in the main circuit, a manually operable pole-changing device, a mil-ammeter or other suitable measuring instrument in the shunt circuit.

The mechanisms particularly shown and described herein are of an illustrative character and other suitable mechanisms for modifying the current in the manner herein described may be substituted or employed within the broad scope of the invention claimed. The apparatus or connections may also be modified as will be understood by those skilled in the art to cause the production of the various modified forms of currents in the main circuit, instead of the shunt branch, within the spirit and scope of the invention claimed.

The mechanism illustrated in the accompanying drawings comprises a base 1 having mounted upon it a motor 2 to the usual binding posts 3 and 4 of which a power current may be supplied and a generator 5 the shaft 6 of which is directly coupled to the shaft 7 of the motor. The generator 5 is provided with a single winding adapted when associated with selective conducting means to produce either a direct current, an alternating current, or a pulsatory direct current, this being accomplished by providing commutators and complementary brushes connecting with the circuits at one end of the generator and delivering the direct current to positive and negative terminals 8 and 9 at one end of the generator and suitable contact rings and brushes at the opposite end of the generator through which an alternating current may be delivered through binding posts 10 and 11. A pulsatory direct current may be delivered from the generator by employing one of the terminals 8 or 9 of the direct current and one of the terminals 10 or 11 of the alternating current and the current thus produced may be modified selectively in the manner hereinafter described.

The direct current from the generator is delivered through suitable binding posts 12 and 13 and the alternating current through suitable binding posts 14 and 15 of the selector mechanism, hereinafter to be described, from which the selected current is passed through the main circuit which preferably includes a fixed resistance 16 and a rheostat 17 having adjustable means by which a current of desired voltage may be shunted through a branch circuit comprising means for selectively creating waves or surges of different characters in said shunt circuit.

The rheostat which is illustrated herein comprises a cylindrical coil of resistance wire through which the main current passes and a suitable conductor leading therefrom to the selector switch from which the selected current returns through the proper binding post and conductor to the generator or other current supply.

The rheostat illustrated comprises a cylindrical insulating member having wound thereupon a resistance wire 18 and a conductor bar 19 extending in parallelism with the axis of the surface of the coil leading to and forming a part of a shunt branch of the main circuit. A sliding contact 20, mounted upon the conductor bar 18, provides means by which greater or less resistance may be introduced into the shunt circuit and a current in the shunt circuit of the desired voltage thereby produced.

*The wave forming mechanism.*

The shunt branch also includes wave creating mechanism which, in the particular embodiment of the invention illustrated, is in the form of a resistance comprising a resistance wire 21 wound in a single layer upon a rectangular porcelain plate 22 which is mounted upon the base and an arm 23 which is pivotally mounted upon a stud 24 extending upwardly from the base 1 and has at its distal end a contact member or brush 25 which engages the resistance wire 21. The arm 23 has an extension 26 which desirably is provided with an antifriction member, such as, a roller 27 which engages the face 28 of a cam 29 which is detachably supported upon a horizontal rotatable disk 30 in any suitable manner as, for example, by means of apertures to receive an extension of the shaft 31 of the disk and a socket to receive a pin 32 extending upwardly from the disk 30 at a convenient distance from the axis thereof. A suitable spring 33, secured at one end to the arm 23 and at its other end anchored upon the base 1, holds the anti-friction member at the end of the arm extension 26 firmly in engagement with the face of the cam.

In the construction illustrated a conductor of the shunt circuit is connected to one end of the resistance wire 21 and another conductor, connected to the arm 23 adjacent its pivot, leads from said arm to suitable contact terminals of the selector switch mechanism for the purpose of delivering the modified currents of the character hereinafter described to the line circuit which, for clearness of description, may be defined herein as the "patient's circuit" and which, of course, is a continuation or extension of the shunt branch.

Any suitable means preferably comprising variable speed mechanism may be provided for rotating the cam-supporting disk or member at a desirable rate of speed. In the preferred embodiment of the invention illustrated herein the shaft 6 of the generator is extended beyond the end of the generator and provided with a worm 34 which engages a worm gear 35 carried by a shaft 36 which is mounted in suitable brackets 37 depending from the under face of the base 1. A cone 38 is fixedly secured to the shaft 36 and through suitable intermediate mechanism actuates a complementary cone 39 which is fixedly secured upon a shaft 40 mounted in bearings in a frame 41 which also is secured to and depends from the under face of the base 1. The shaft 40 is provided at its end with a bevel or mitre gear 42 which engages a complementary bevel or mitre gear 43 upon the shaft 31 upon which the horizontal cam-supporting disk 30 is secured.

Any suitable means may be provided for transmitting rotation to the cone 39 from the cone 38. In the particular construction illustrated a roller 44, which engages the surfaces of the cones 38 and 39, is rotatably mounted upon a cylindrical rod 45 which is supported at one end in an extension of the bracket 37 and at its opposite end upon a similar bracket forming a part of the frame 41. A sliding member 46, having a bifurcated end portion embracing the roller, extends upwardly through a slot 47 in the base and is provided with a suitable handle and with an index 48 which passes over a scale 49 located adjacent to the slot 47 so that by moving the roller-shifting device along the slot to points indicated by numerals or other indicia upon the scale a desired speed of rotation may be transmitted from the generator shaft to the cam-supporting disk 30.

By reason of this construction the rotation of the cam imparts an oscillatory movement to the arm 23 causing its contact member or brush 25 to pass over the resistance wire 21 thereby increasing or decreasing the resistance in conformity to the movement of the arm. By thus increasing or decreasing the resistance in the shunt electric waves of various forms are delivered to the selector and from which the modified current is transmitted to the patient's circuit. By substituting cams of different contour any desirable wave form may be created. Thus by suitably adjusting the sliding contact 20 upon the wires 18 of the resistance 17 a current of the desired voltage may be supplied to the patient's circuit and this current so modified, by proper setting of the variable speed mechanism which controls the rotation of the cam and by the provision of a cam of a predetermined form, to produce surges in the current supplied to the patient's circuit which will conform substantially to the normal action of the muscle, either voluntary or involuntary, which is to be treated.

By selectively utilizing a direct, a sinusoidal or a pulsatory current and selectively modifying the same in the manner described numerous treatments of different character may be employed as required by the condition of the patient.

The wave reverser.

It has heretofore been mentioned that in certain cases it is desirable to change the polarity of a galvanic, or pulsatory current to obtain the most beneficial effects; and further that so far as is known no mechanism has been provided for selectively creating intermittent surging waves in basic currents with intervening predetermined periods of rest which desirably correspond to the periodicity of the wave.

A further object of the invention is to provide a current reversing mechanism which may be selectively introduced into the shunt branch of the circuit to produce these intermittent effects.

In the present embodiment of the invention the current reverser comprises a pair of segmental, preferably semicylindrical, contact members 50 and 51 which are mounted upon a shaft 52 and are insulated from each other and from the shaft by a suitable insulation 53. Brushes 54 and 55, positioned to engage the cylindrical surfaces of the current reverser, are connected respectively to conductors leading from the resistance 18 of the rheostat 17 and to the resistance 21. The rotatable segmental contact members 50 and 51 of the current reversing mechanism are connected by conductors 56 and 57 respectively to contact rings 58 and 59 mounted upon, but insulated from the shaft 52 of the current reverser. Suitable brushes 60 and 61, engaging the contact rings 58 and 59 respectively, are connected by suitable conductors to different terminals of the selector mechanism which is so constructed, as will hereinafter more fully appear, that the current reverser may be utilized either to reverse the direct or pulsatory current at predetermined intervals or to interrupt the selected current in the shunt and patient's branch at predetermined intervals, thereby providing for a still wider variation of the form, type and characteristics of the current which is supplied to the patient's circuit.

The selector mechanism.

Any suitable type of selector mechanism may be employed. In the preferred embodiment of the invention illustrated herein terminals from lines leading to and from the various mechanisms are in the form of groups of parallel bars or blocks insulated from each other with a movable selector having contact members to engage the bars or blocks of the respective series in such a manner that by the movement of the contact member forward or backward in a straight line the type of basic current and the various types of modified current may be readily selected.

One of the groups of contacts of the selector comprises blocks having contact members $a$, $b$, $c$, $d$, $e$, $f$, $g$, $h$, $i$, $j$, and $k$, arranged in a straight line and a complementary parallel bar $l$ from which a conductor leads to the patient's circuit. Another group of contacts comprises blocks $m$, $n$, $o$, $p$, $q$, and $r$, and a complementary parallel bar $s$ from which a conductor leads to the patient's circuit. Another group comprises a bar $t$ and complementary contact blocks or plates $u$, $v$, and $w$ for one of the leads of the basic currents, while the other group comprises a bar $x$ and contact plates or blocks $y$ and $z$ for the other lead of the basic currents.

The blocks and complementary bar of each group may be connected by a sliding member 62 carrying contact members 63, 64, 65 and 66 adapted respectively to electrically connect the selected block of the respective groups with the bar of its group, thereby completing the direct circuit and the shunt branch which leads to the patient's circuit selectively either directly or through the particular mechanism required to produce the desired current effect. Conductors 67 and 68 lead from the bars $l$ and $s$ of the selector to the patient's section of the branch of the shunt circuit. Desirably a pole-changer is introduced into this branch in order that a current of the desired polarity may be delivered to the patient.

Any suitable pole-changer may be provided. The illustrative form shown in the drawings comprises a pair of L-shaped conductors 69 and 70 mounted upon an insulated member 71 which is located below the base of the machine and is carried by a shaft 72 extending upwardly through the base and provided with a winged handle 73 and also desirably with an index 74 which may be turned to point to suitable indicia, such as, plus and minus signs, or the words "Positive" and "Negative" located at suitable points upon the surface of the base to indicate the direction in which the current is delivered through the pole-changer. The L-shaped members 69 and 70 are arranged alternatively to contact with terminals 75 and 76 of the conductors 67 and 68 and with contacts 77 and 78 leading to binding posts 79 and 80 to which may be connected suitable flexible conductors having at their ends electrodes adapted to be applied to the body of the patient.

A current measuring device, such as, a mil-ammeter 81 desirably is connected in the line leading from the pole-changer to the patient's circuit in order that the intensity of the current may be observed by the operator.

The selector connections.

It has been heretofore stated that the apparatus disclosed herein is adapted to receive or to generate a suitable basic current. An externally generated direct current may be applied to the binding posts 12 and 13 of the selector mechanism and an alternating current may be supplied to the binding posts 14 and 15 of the selector mechanism.

Where the apparatus comprises a motor and a generator as illustrated herein a direct current may be supplied to the apparatus by connecting the positive and negative terminals 8 and 9 of the generator by suitable conductors with the positive and negative binding posts 12 and 13. An alternating current may be supplied by connecting the terminals 10 and 11 of the generator with the binding posts 14 and 15 of the selector and a pulsatory current may be supplied by connecting one of the terminals 8 or 9 of the generator with the corresponding binding posts 12 or 13 of the selector and also connecting one of the alternating current terminals 10 or 11 of the generator with one of the binding posts 14 or 15 of the selector.

The direct alternating or pulsatory currents may also be obtained from a rotary converter by connecting the direct terminals thereof to the binding posts 12 and 13 of the selector to produce a galvanic current; by connecting the terminals for the alternating current of the converter to the binding posts 14 and 15 of the selector, or by connecting one of the terminals of the direct current with the binding post 12 or 13 and one of the terminals of the rotor for the alternating current with one of the binding posts 14 or 15 of the selector.

In the operation of the machine illustrated the generator desirably is driven by the motor at a constant speed of approximately eighteen hundred revolutions per minute and the wave-forming mechanism actuated to produce waves having a duration of from one-half second or less up to ten or more seconds as desired. Cams of various forms desirably are provided for producing different forms of waves corresponding substantially to the normal actions of the usual muscles to be treated. The reversing device is rotated in synchronism with the waveforming mechanism and preferably driven at one-half the speed of the wave-forming mechanism. Insulated central portions of the current reverser are so disposed with relation to the co-operating contacts or brushes that the reversal of the current occurs at the time the current in the patient's circuit is at zero or at a minimum.

Figure 3:
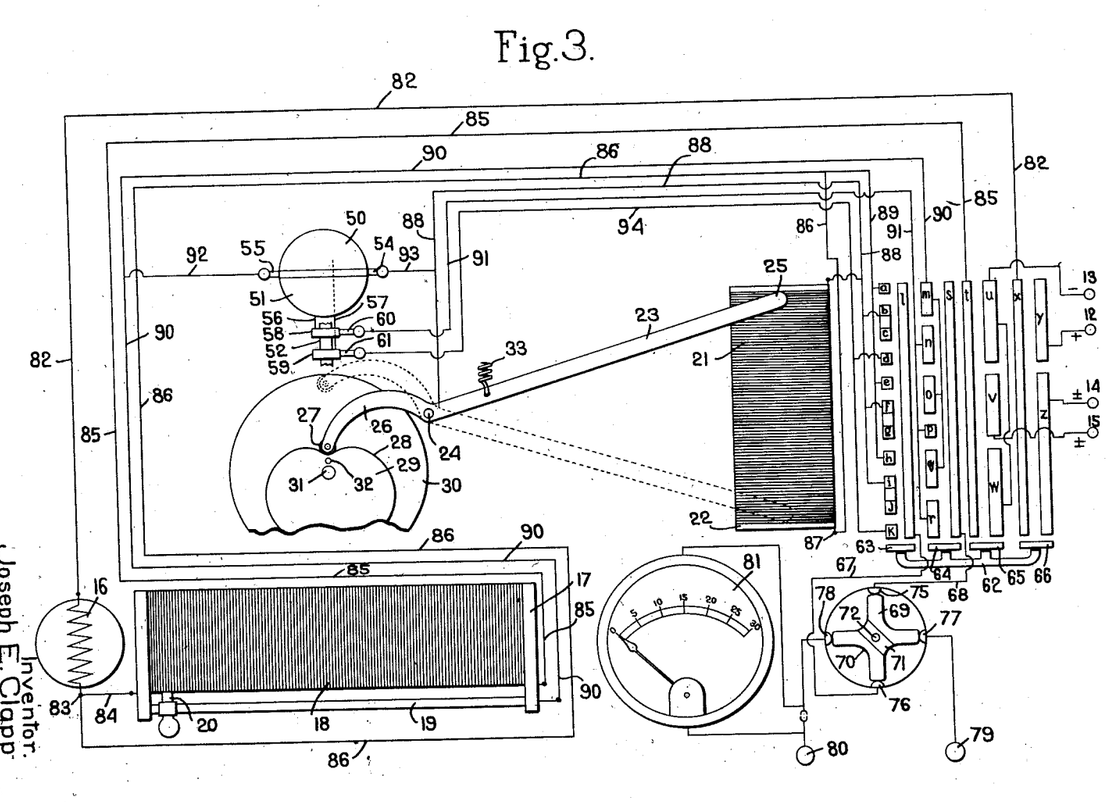
Fig. 3 is a view, mainly diagrammatic, illustrating the circuits, the wave-producing mechanism, the current reverser, and the pole-changing device and a preferred form of selector mechanism for controlling the character of the currents produced in the main circuit and shunt branch.

The circuits of the mechanism herein described are graphically illustrated in Fig. 3 of the drawing in which, for purpose of clearness, the sliding contact device of the selectors is shown in side elevation, and in which the shaft 52 for the rotor is illustrated as broken off and in a position at right angles to its normal position which is axially of the rotating semi-circular contact members 50 and 51.

The circuits.

The basic currents which are supplied either from an external source or from the generator to the terminals 12, 13, 14 and 15 as above described are conducted through a common circuit which contains the rheostat 17 and a shunt from this main circuit is taken off from the rheostat through the sliding contact member 20 so that the desired selected voltage in the patient's circuit may be obtained.

As illustrated herein the direct current passes through the positive terminal 12 to the plate $y$ and from this plate through the contact member 66 of the selector slide to the bar $x$ from which it passes through the conductor 82 to and through the resistance 16 to a binding post 83 at which point the circuit branches into two sections, one branch passing through the conductor 84, thence through the resistance wires 18 of the rheostat to the conductor 85 which leads to the conductor bar $t$ from which the current passes through the selector 62 when the selector bar is in the uppermost or highest position to the plate $u$ and thence to the negative binding post 13.

Where an alternating circuit is employed the selector slide 62 is placed at intermediate points of the selector and the alternating current passes from the terminal 14 to the plate $z$, thence through the contact 66 of the movable selector to the bar $x$ from which it passes through the conductor 82, resistance 16, conductor 84, the resistance wires 18 to the conductor 85 and returns through said conductor to the bar $t$ from which it passes through the contact member 65 of the selector to the plate $v$ and thence to the terminal 15.

The pulsatory current is produced in the circuit from the generator by connecting one of the terminals 8 or 9 of the direct current to the binding posts 12 or 13 and one of the terminals of the alternating current to one of the binding posts 14 or 15 as heretofore described. When thus connected in the apparatus shown the selector slide is placed at the lowest position and the negative terminal of the generator or source of direct electric current is connected to the negative terminal 13 from which the direct current passes to the bar $w$, thence through the contact member 65 of the slidable selector to the bar $t$ to which one of the conductors of the main circuit is connected. One of the terminals of the generator leading from the end of the generator from which the alternating current is delivered is connected to the terminal 14 of the selector switch from which the current passes to the bar $z$ and through the contact member 66 of the movable selector to the bar $x$ to which the other conductor 82 of the main circuit is connected. By reason of this connection the current which is supplied to the main circuit is a pulsatory, but non-reversing current.

*The shunt branch which includes the patient's circuit.*

The shunt branch, which includes the patient's circuit through which various currents are passed either in basic or modified form, comprises a conductor 86 which leads from the terminal 83 of the resistance 16 to the terminal 87 of the resistance 21 and from which it may pass selectively through the arm 23 and conductor 88 to certain of the bars of the selector mechanism, or through a branch 89 directly to other bars of the selector mechanism and thence through the contact member 63 of the sliding selector member through the bar $l$ to the patient's circuit and returning from the patient's circuit to the bar $s$ of the selector switch, thence through the contact 64 of the movable selector member to blocks of the selector through conductor 90 to the bar 19 of the rheostat and through the sliding contact 20 to the resistance wire 18 of the rheostat, or upon certain settings the current returning from the patient's circuit may pass through the bar $s$ of the selector and contact member 64 of the sliding selector member to the conductor 91, thence through the reversing mechanism and line 90 to the bar 19 of the rheostat, the sliding contact 20 and the wire 18 of the rheostat.

*The setting of the selector for obtaining the various currents in the shunt or patient's branch.*

Figure 10:
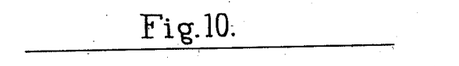
Fig. 10 is a graphic illustration of a basic, direct or galvanic current.

When the movable selector member 62 is placed at the highest position which connects the contact blocks and bars $a$ and $l$, $m$ and $s$, $t$ and $u$, and $x$ and $y$, and a direct or galvanic current is supplied to the terminals 12 and 13 of the selector switch the shunt current passes from the terminal 83 through the conductor 86 and branch 89 to the contact block $a$, thence through the contact member 63 of the sliding selector to the bar $l$ from which it passes through the pole-changing device to the patient's circuit. Returning from the patient's circuit through the pole-changing device the current passes through the bar $s$ of the selector, thence through the contact member 64 of the sliding selector to the block $m$ of the selector, thence through the conductor 90 to the bar 19 and sliding contact 20 to the resistance wire 18, the difference of voltage between the binding post 83 and the position at which the sliding contact 20 engages the resistance wire of the rheostat determining the voltage of the direct or galvanic current in the patient's circuit. The direct galvanic current thus produced is illustrated in Fig. 10 of the drawing.

Figure 11:
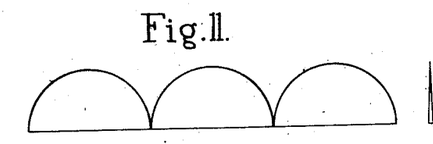
Fig. 11 is a graphic illustration of a galvanic surging current.

A galvanic surge is obtained by placing the sliding connector of the selector mechanism in a position to connect the contact blocks and bars $b$ and $l$, $m$ and $s$, $t$ and $u$, $x$ and $y$, in which case the direct current of the shunt flows through the conductor 86 to the terminal 87 of the wave-creating resistance, thence through the resistance and through the oscillating arm 23 which is actuated by the cam 29, so that the contact brush 25 at its distal end will pass over and vary resistance in the branch to create waves or surges, thence through the conductor 88 to the conductor block $b$, thence through the contact member 63 of the sliding selector bar to the bar $l$ from which it flows through the pole-changer and the patient's circuit and returns from the patient's circuit through the conductor bar $s$, the contact member 64 of the selector, the block $m$ and conductor 90, through the bar 19 and adjustable contact member 20 to the wires 18 of the rheostat. When the current is passing through this circuit the variation of the resistance 21 in the circuit by the oscillatory movement of the arm 23 will produce surges of the current such as are graphically represented in Fig. 11 of the drawing.

Figure 12:
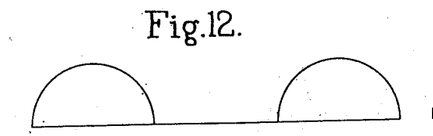
Fig. 12 is a graphic illustration of an intermittent galvanic surging current.

An intermittent galvanic surge is obtained by placing the sliding connector of the selector so as to connect the contact blocks and bars $c$ and $l$, $m$ and $s$, $t$ and $u$, $x$ and $y$, in which case the current flowing through the shunt conductor 86 passes to the binding post 87 of the resistance 21, thence through the oscillating arm 23 as aforesaid, through the conductor 88, the blocks $b$ and $c$, the bar $l$ to the patient's circuit and returns from the patient's circuit as aforesaid through the bar $s$, the contact 64 of the sliding selector, the block $n$, thence through the conductor 91 to the brush 60 of the pole-changing device, thence through the conductor 57 to the semi-circular section 50 of the pole-changer, thence through the brush 55 of the pole-changer and conductor 92 to the conductor 90 from which it returns through the bar 19 and adjustable contact member 20 of the rheostat as aforesaid. By reason of the fact that the current passes through but one of the semi-circular sections of the pole-changing device the current is alternately interrupted and thereby prevented from reversing, thus producing the intermittent galvanic current diagrammatically illustrated in Fig. 12 of the drawing.

Figure 13:
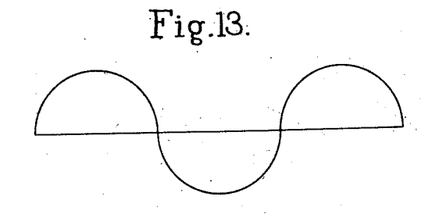
Fig. 13 is a graphic illustration of a reversing galvanic surging current.

The reversing galvanic surge is obtained by placing the sliding connector of the selector so as to connect the blocks and bars d and l, n and s, t and u, x and y. By reason of this connection the current passes through the shunt branch 86 to the terminal 87 of the resistance 21, thence through the resistance and oscillating arm 23 to the conductor 88, thence through the conductor 93 which leads to the brush 54 which contacts with the semi-circular members 50 and 51 of the rotating current reverser, thence alternately through the conductors 50 and 51, alternately through the brushes 60 and 61, the current passing from the brush 61 through the conductor 94 to the terminal d, through the contact member 63 of the sliding selector and bar l to the patient's branch and returns from the patient's branch through the bar s through the contact member 64 of the sliding selector to the block n, thence through the conductor 91 to the brush 60 of the reverser and from this alternately through the semi-circular conductor 51 of the reverser to the conductors 92 and 90 which lead to the bar 19 and adjustable contact member 20 which engages the resistance wire 18 of the rheostat, thus producing the galvanic surge illustrated in Fig. 13.

Figure 14:
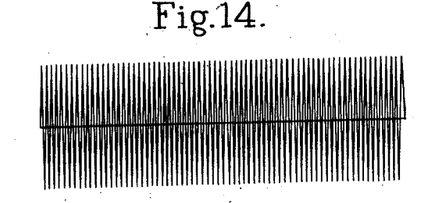
Fig. 14 is a graphic illustration of a basic rapid sinusoidal current.

The basic rapid sinusoidal current is obtained by placing the sliding conductor so as to connect the blocks and bars of the selector switch e and l, o and s, t and v, x and z, by reason of which connections the shunted current passes through the conductor 86 directly to the block e, thence through the contact member 63 of the movable selector to the bar l, through the patient's circuit, and returns from the patient's circuit to the bar s, from which it passes to the block o which is electrically connected with the block m and from the block m through the conductor 90 to the rheostat as aforesaid. The rapid sinusoidal current thus produced is illustrated in Fig. 14.

Figure 15:
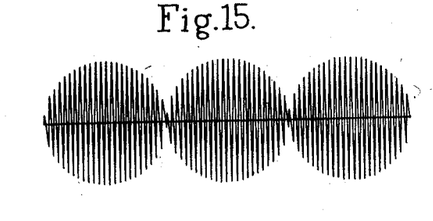
Fig. 15 is a graphic illustration of a rapid sinusoidal surging current.

The rapid sinusoidal surge is obtained by placing the sliding connector of the selector so as to connect the blocks and bars f and l, o and s, t and v, x and z. The alternating shunt current thereby passes through the conductor 86 to the terminal 87 of the resistance 21, thence through the resistance, the oscillating arm 23, the conductor 88 to the block f, thence through the contact member 63 of the sliding selector to the bar l, and from the bar l through the patient's circuit, and returns from the patient's circuit through the bar s, the contact member 64 of the sliding selector to the block o which is connected to the block m and from which the current passes through the conductor 90 to the rheostat as aforesaid. The current thus produced is illustrated in Fig. 15.

Figure 16:
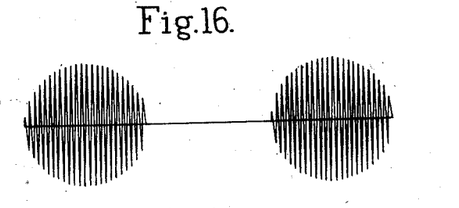
Fig. 16 is a graphic illustration of an intermittent rapid sinusoidal surging current.

The intermittent rapid sinusoidal surge is obtained by placing the sliding selector to connect the blocks and bars g and l, p and s, t and v, x and z, under which conditions the shunted alternating current passes through the conductor 86 to the terminal 87 of the resistance 21, thence through the resistance 21 and the oscillating arm 23, the conductor 88 to the contact block f which is continuous with g, thence through the contact 63 of the sliding selector to the bar l and through the patient's circuit, and returns from the patient's circuit through the bar s, the contact 64 of the sliding selector to the block p, thence through the conductor 91 to the brush 60 of the ring 58 of the current reverser, thence through the conductor 56 to the semi-cylindrical conductor of the reverser, and through the brush 55 and conductors 92 and 90 to the adjustable contact of the rheostat, thus producing the intermittent rapid sinusoidal current illustrated in Fig. 16 for the reason that the semi-circular conductor of the current reverser only permits the passage of the current when it is engaged with the brush 55 of the current reverser.

Figure 17:
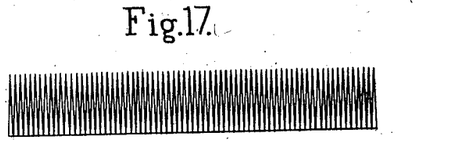
Fig. 17 is a graphic illustration of a basic rapid pulsatory galvanic current.

The basic rapid pulsatory current is obtained by placing the sliding connector so as to connect the bars and blocks h and l, q and s, t and w, x and z. The shunt circuit through which the current passes is identical with that above described with the sliding selector contact in the first position for the reason that the contact blocks a and h, are connected by a conductor and the contact blocks q and m likewise connected by a conductor. The current, however, impressed upon the circuit differs from that in the first circuit for the reason that one of the terminals of the alternating current is connected to the binding post 14 which leads to the bar z of the selector instead of the positive terminal of the direct current being connected to the binding post 12, so that, instead of the direct current, the pulsatory current which is graphically illustrated in Fig. 17 is produced.

Figure 18:
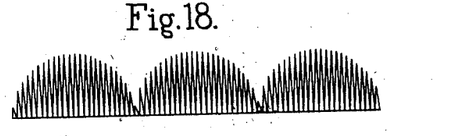
Fig. 18 is a graphic illustration of a pulsatory galvanic surging current.

The pulsatory galvanic surge is obtained by placing the sliding selector so as to connect the blocks and bars i and l, q and s, t and w, x and z. When thus connected the pulsatory current follows the same circuit as above described when the selector is placed in second position in contact with the blocks b and l, m and s, t and u, x and y, for the reason that the blocks i and b are connected by a conductor and the blocks q and m are likewise connected by a conductor, the current supplied to the patient differing in that a pulsatory current is produced such as is illustrated in Fig. 18 instead of a surging galvanic current illustrated in Fig. 11.

Figure 19:
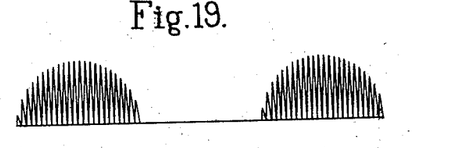
Fig. 19 is a graphic illustration of an intermittent pulsatory galvanic surging current; and, Fig. 20 is a graphic illustration of a reversing pulsatory galvanic surging current.

The intermittent pulsator galvanic surge is obtained by placing the sliding selector so as to connect the bars and blocks j and l, r and s, t and w, x and z, the current in the shunt in the patient's circuit, under these conditions, following the same circuit as that produced when the selector is in the third position in contact with the blocks and bars c and l, n and s, t and u, x and y, for the reason that the blocks j and i are connected to the blocks b and c and the block r is connected to the block n. The intermittent pulsatory galvanic surge thus produced is illustrated in Fig. 19 of the drawing.

Figure 20:
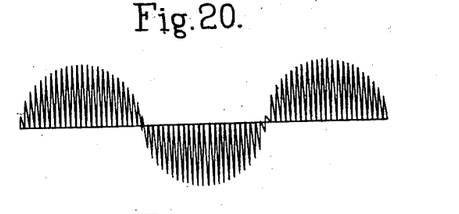

The reversing pulsatory galvanic surge is obtained by placing the sliding selector in the lowermost position so as to connect the bars and blocks k and l, r and s, t and w, x and z, the current in this instance following the same course as that of the galvanic current when the connector is placed in position to engage the blocks and bars d and l, n and s, t and u, x and y, with the exception that instead of a direct or galvanic current a pulsatory current is impressed upon the circuit, thus producing the reversing pulsatory galvanic surge, illustrated in Fig. 20.

Figure 1:
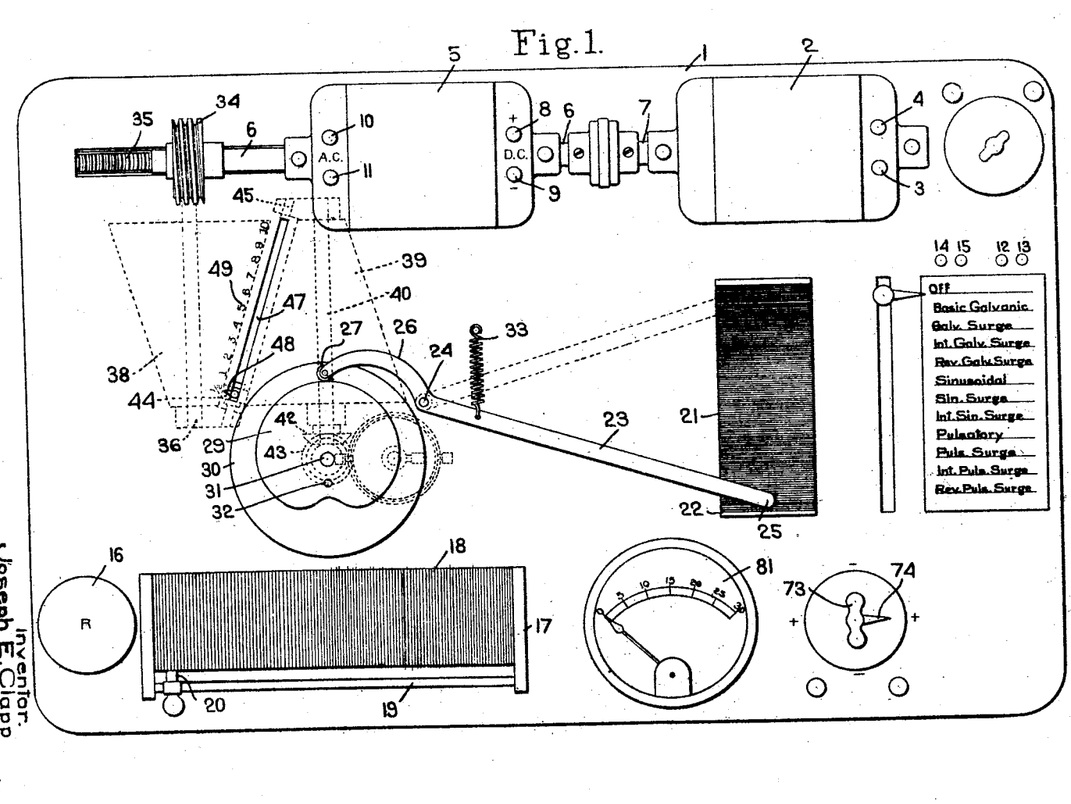
Fig. 1 is a plan view of the preferred form of apparatus embodying the invention.
Figure 2:
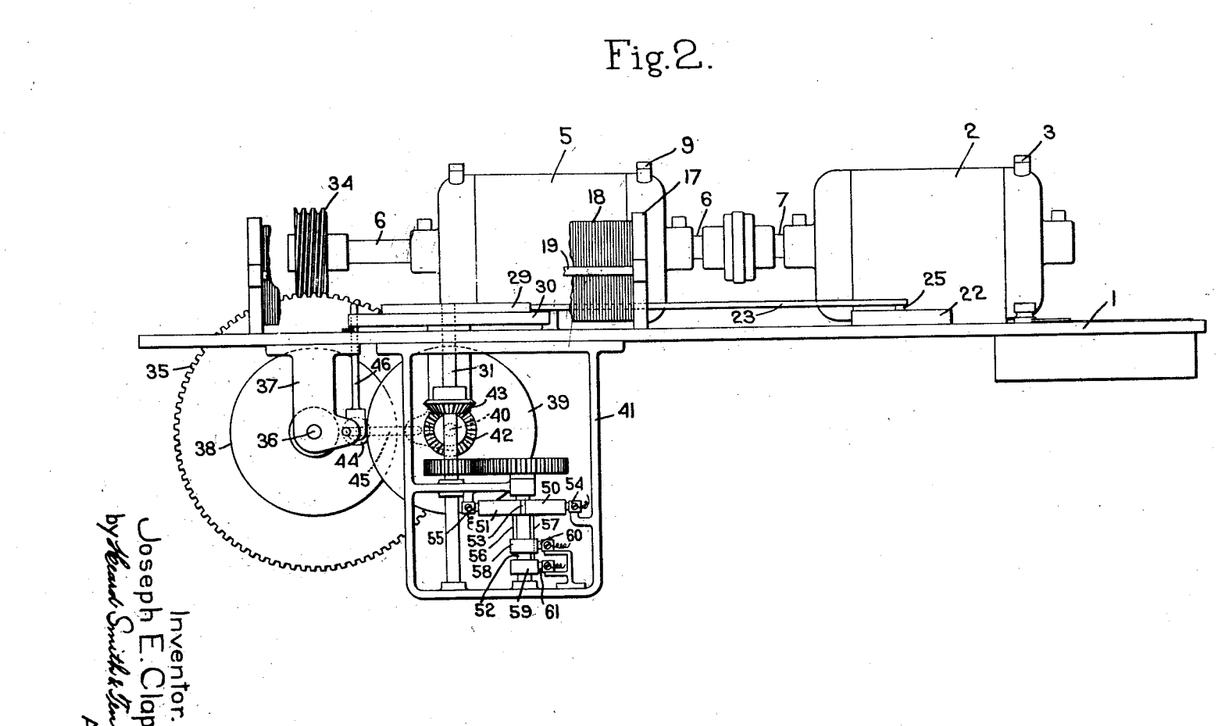
Fig. 2 is a side elevation of the same, a portion of the variable resistance mechanism or rheostat of the shunt circuit being broken away to disclose other parts of the apparatus.
Figure 4:
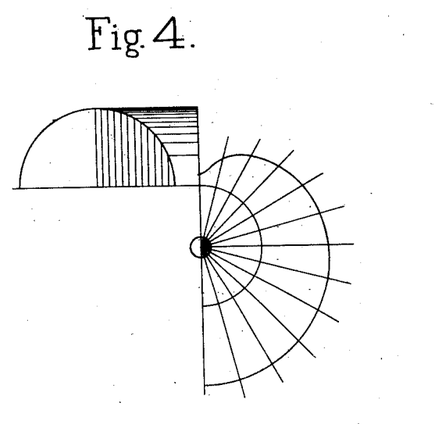
Figs. 4, 5, 6, 7, 8 and 9 illustrate diagrammatically portions or the whole of cams for producing various forms of waves, the development of which waves is also illustrated in association with the respective cams.
Figure 5:
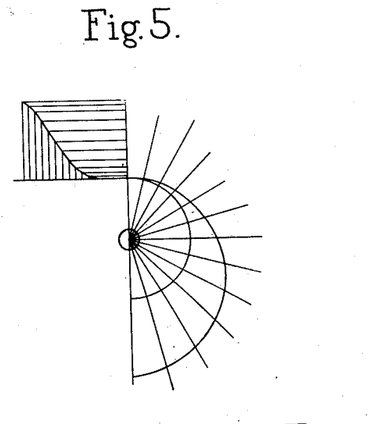
Figures 6, 7:
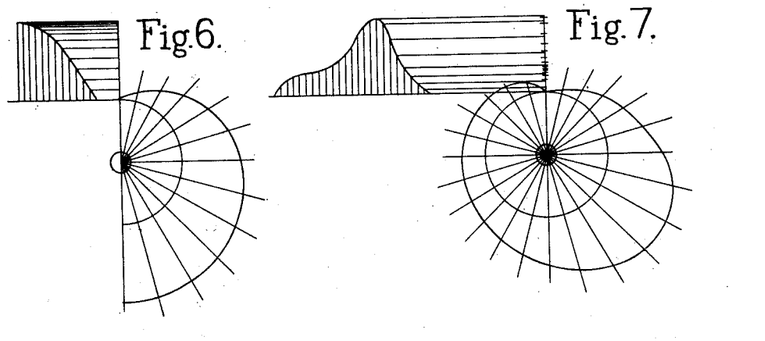
Figures 8, 9:
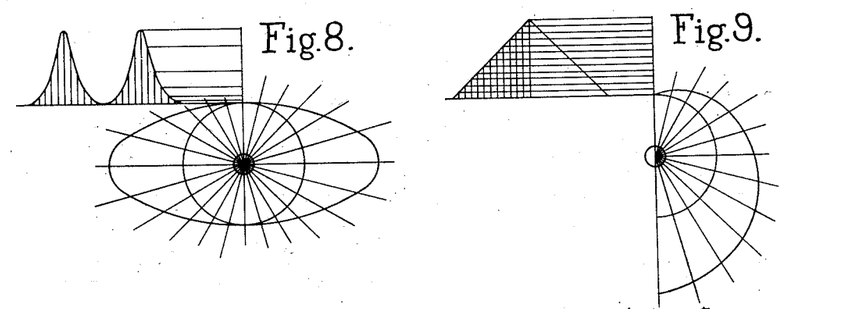

The waves or surges of the various types of currents heretofore described are of a regular and symmetrical character, the waves increasing from zero potential, or a predetermined minimum potential, gradually to a maximum and symmetrically decreasing from the maximum to minimum, such waves being illustrated graphically by substantially semi-circular contour. The waves may be thus produced by a cam of substantially heart-shaped form as illustrated in Figs. 1, 3 and 4 of the drawing. Various other wave forms may be produced by employing cams of different contour either of a symmetrical or non-symmetrical form. Illustrative examples of such cams and the waves produced thereby are shown in Figs. 5 to 9 inclusive. Fig. 5 illustrates one-half of a symmetrical cam of cylindrical form having its axis eccentrically disposed with respect to the circumference and the wave produced thereby is one which at first rises gradually, then more abruptly to the maximum and rapidly decreases from the maximum symmetrically and finally decreases more gradually to the minimum. Fig. 6 shows a substantially heart-shaped cam which rises more abruptly from zero potential and more gradually as it approaches the maximum and decreases in a symmetrical manner. Fig. 7 illustrates a cam of irregular contour which produces a wave of the character illustrated in connection with the cam. Fig. 8 illustrates a cam having two lobes symmetrically arranged, adapted to produce upon each revolution two periods in which the wave increases from minimum to maximum, each surge commencing somewhat gradually and thereafter rapidly increasing to the maximum and decreasing in the same manner. Fig. 9 illustrates another symmetrical, but different form of cam, generally heart-shaped in contour, which causes the voltage to rise uniformly to the maximum and to decrease symmetrically from the maximum to the minimum.

It will be obvious that various other types of cams may be designed to accord with the character of the waves which are required to stimulate the action of the muscles of the body and that the forms of cams shown in the drawings are merely illustrative of some of the various designs which may be employed for producing surges of desired forms in the shunt circuit.

It will also be understood that various other means may be employed within the spirit and scope of the following claims for producing the current effects herein described.

Having thus described the invention, what is claimed as new, and desired to be secured by Letters Patent, is:

1. A machine of the class described comprising means for supplying a basic electric current, a circuit for said electric current, means in said circuit for varying the voltage of the current in said circuit to create waves and means operable in synchronism with said wave-creating means for producing rest periods intermediate of predetermined waves created in said circuit.

2. A machine of the class described comprising means for supplying a basic electric current, a circuit for said electric current, means in said circuit for varying the voltage in said circuit to create waves and means selectively operable to cause said waves to be successive or intermittent.

3. A machine of the class described comprising means for supplying a basic electric current, a circuit for said electric current, means in said circuit for varying the voltage in said circuit to create waves and means selectively operable to cause said waves to be of predetermined frequency and of alternating polarity or to be unidirectional and of the same frequency as the waves having alternating polarity.

4. A machine of the class disclosed comprising a generator having means for producing a pulsatory current, a circuit for said current and selective means for varying the voltage in said circuit to create uniform waves of similar polarity, uniform waves of alternating polarity or intermittent waves of similar polarity.

5. A machine of the class described comprising a generator having means for selectively producing a direct, a sinusoidal or a pulsatory current, a circuit to receive the selected current, means for varying the voltage in said circuit to produce waves and means selectively operable to cause the waves of the selected current to be successive or intermittent.

6. A machine of the class disclosed comprising a generator having co-operating contact members selectively operable to deliver therefrom a direct current, a sinusoidal current or a pulsating current, a circuit to receive the selected current, selective means operable to vary the voltage in said circuit to produce waves in the current therein, and having means respectively for controlling the variation of said voltage to modify said waves to various regular or irregular forms.

7. A machine of the class disclosed comprising a generator having co-operating contact members selectively operable to deliver therefrom a direct current, a sinusoidal current or a pulsatory current, a circuit to receive the selected current, selective means operable to vary the voltage in said circuit to produce waves in the current therein, having means respectively for controlling the variation of said voltage to modify said waves to various regular or irregular forms, and means selectively operable to cause said waves to be successive or intermittent.

8. A machine of the class disclosed comprising a generator having co-operating contact members selectively operable to deliver therefrom a direct current, a sinusoidal current or a pulsatory current, a circuit to receive the selected current, selective means operable to vary the voltage in said circuit to produce waves in the current therein, having means respectively for controlling the variation of said voltage to modify said waves to various regular or irregular forms, means selectively operable to cause said waves to be successive or intermittent, and means for producing any degree of variation in the frequency of said waves within a predetermined limit.

9. A machine of the class described comprising a circuit for an electric current, including a rheostat, a shunt branch of said circuit connected to said rheostat and leading therefrom, a resistance in said branch, a contact member engaging said resistance and movable thereupon to vary the effective resistance in said shunt branch and means for actuating said contact member to produce waves in the shunt branch of said circuit.

10. A machine of the class described comprising a circuit for an electric current, including a rheostat, a shunt branch of said circuit connected to said rheostat and leading therefrom, a resistance in said branch, an arm having a contact engaging said resistance, a rotatable member and means for actuating the same, means for detachably securing to said rotatable member interchangeable devices having cam faces of different contours to engage and actuate said arm and means for maintaining said arm in engagement with the selected cam device whereby the effective resistance in said shunt branch may be varied to produce waves in said circuit.

11. A machine of the class described comprising a circuit for an electric current including a rheostat, a shunt branch of said circuit connected to said rheostat and leading therefrom, a resistance in said branch, an arm having a contact engaging said resistance, a rotatable member and means for actuating the same, means for detachably securing to said rotatable member interchangeable devices having cam faces of different contours to engage and actuate said arm, means for maintaining said arm in engagement with the selected cam device whereby the effective resistance in said shunt branch may be varied to produce waves in said shunt branch and manually operable pole-changing means in said circuit.

12. A machine of the class described comprising a circuit for an electric current, including a rheostat, a shunt branch of said circuit connected to said rheostat and leading therefrom, a resistance in said branch, an arm having a contact engaging said resistance, a rotatable member and means for actuating the same, means for detachably securing to said rotatable member interchangeable devices having cam faces of different contours to engage and actuate said arm, means for maintaining said arm in engagement with the selected cam device whereby the effective resistance in said shunt branch may be varied to produce waves in said shunt branch and means for regulating the current supplied by said generator to said shunt branch.

13. A machine of the class described comprising means for receiving a direct, a sinusoidal or a pulsatory current, a circuit for the current, a resistance in said circuit, a movable contact member in said circuit engaging said resistance and movable thereupon to vary said current and produce waves, a rotatable current reverser in said circuit, means for actuating said contact member and said current reverser in predetermined synchronously timed relation, a manually controlled selector mechanism operable selectively to deliver a direct, a sinusoidal or a pulsatory current to said circuit and also operable selectively to control the wave-producing and current-reversing mechanisms to cause the production of successive or intermittent waves of the selected current.

14. A machine of the class described comprising a generator for supplying an electric current, a circuit for said current, a resistance in said circuit, a pivotally mounted arm having its distal end in engagement with said resistance and movable thereupon to vary the resistance in said circuit, a rotatable cam-supporting member having means detachably to engage a replaceable cam, means for maintaining said arm in engagement with said cam and means for rotating said cam-supporting member from said generator including a frictional variable speed mechanism operable to impart any desired speed of rotation to said cam-supporting member within predetermined limits and thereby produce any desired frequency and duration of the waves which are generated by varying the resistance in said circuit.

15. A machine of the class described comprising a generator for supplying an electric current, a circuit for said current, a resistance in said circuit, a pivotally mounted arm having its distal end in engagement with said resistance and movable thereupon to vary the resistance in said circuit, a rotatable cam-supporting member having means detachably to engage a replaceable cam, means for maintaining said arm in engagement with said cam and means for rotating said cam-supporting member from said generator including a frictional variable speed mechanism comprising rotatable members presenting reversely arranged conical surfaces and an intermediate power transmitting member engaging limited areas of the adjacent surfaces of both of said members and means for moving said transmitting member longitudinally of said rotatable members whereby any desired speed of rotation may be imparted to said cam-supporting member and thereby produce any desired frequency and duration of the waves generated by varying the resistance in said circuit.

16. A machine of the class described comprising a generator for supplying an electric current, a circuit for said current, a resistance in said circuit, a pivotally mounted arm having its distal end in engagement with said resistance and movable thereupon to vary the resistance in said circuit, a rotatable cam-supporting member having means detachably to engage a replaceable cam, means for maintaining said arm in engagement with said cam and means for rotating said cam-supporting member from said generator including a frictional variable speed mechanism operable to impart any desired speed of rotation to said cam-supporting member within predetermined limits and thereby produce any desired frequency and duration of the waves generated by varying the resistance in said circuit, a rotatable current reverser in said circuit and means for rotating the same in synchronously timed relation with the rotation of said cam-supporting member to cause the reversal of the current to occur at the periods of lowest voltage in said circuit.

17. A machine of the class described comprising a generator having means for supplying a direct, a sinusoidal or a pulsatory current, a circuit for said current, a resistance in said circuit, a pivotally mounted arm having its distal end in engagement with said resistance and movable thereupon to vary the resistance in said circuit, a rotatable cam-supporting member having means detachably to engage a replaceable cam, means for maintaining said arm in engagement with said cam and means for rotating said cam-supporting member from said generator including a frictional variable speed mechanism operable to impart any desired speed of rotation to said cam-supporting member within predetermined limits and thereby produce any desired frequency and duration of the waves which are generated by varying the resistance in said circuit and controlling means operable simultaneously to select the current to be furnished to said circuit and thereby selectively to cause the production in said circuit of unidirectional sinusoidal or pulsatory waves or intermittent unidirectional or intermittent sinusoidal or intermittent pulsatory waves or reversed unidirectional or reversed pulsatory waves.

In testimony whereof, I have signed my name to this specification.

JOSEPH E. CLAPP.